June 26, 1928.
G. S. DAUPHINEE
AIR FILTER
Filed July 14, 1925   2 Sheets-Sheet 1
1,674,764
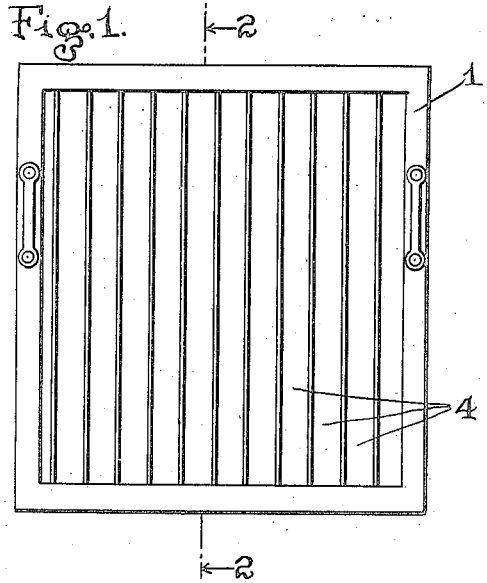
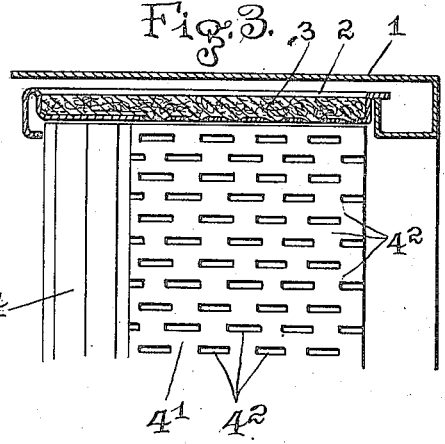
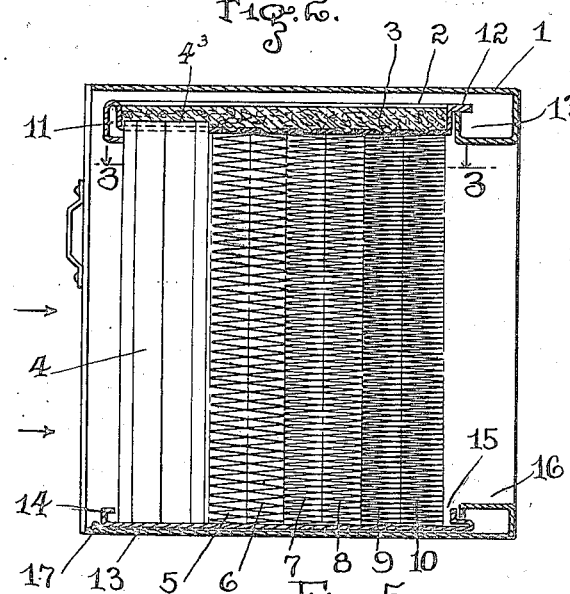
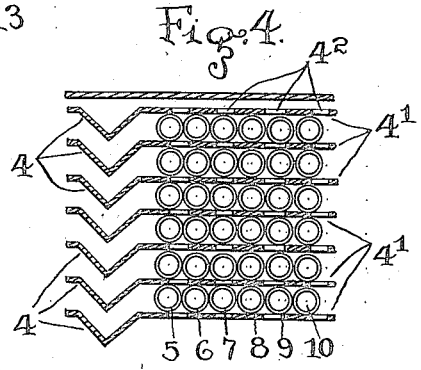
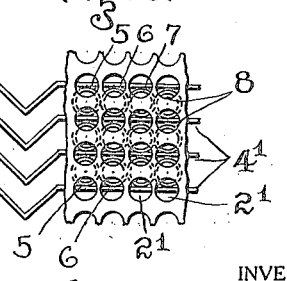
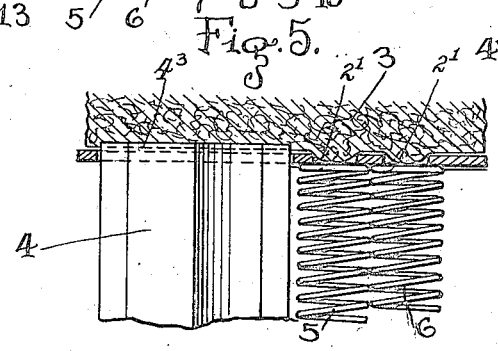

June 26, 1928.
G. S. DAUPHINEE
AIR FILTER
Filed July 14, 1925    2 Sheets-Sheet 2
1,674,764
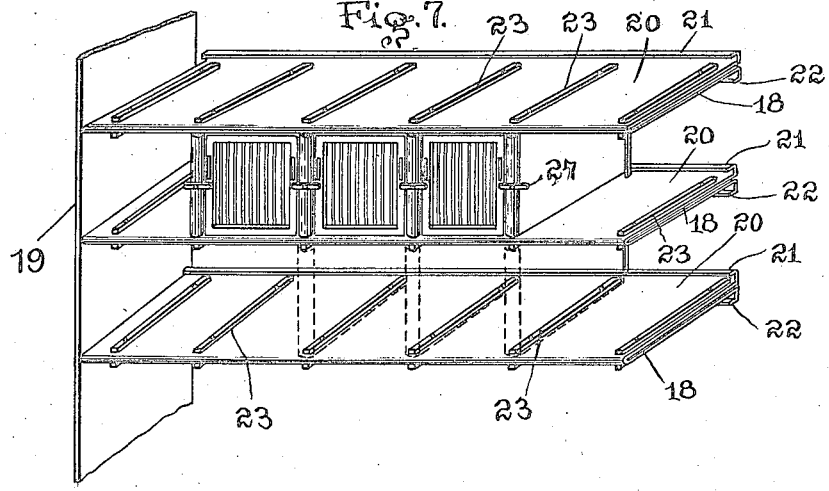
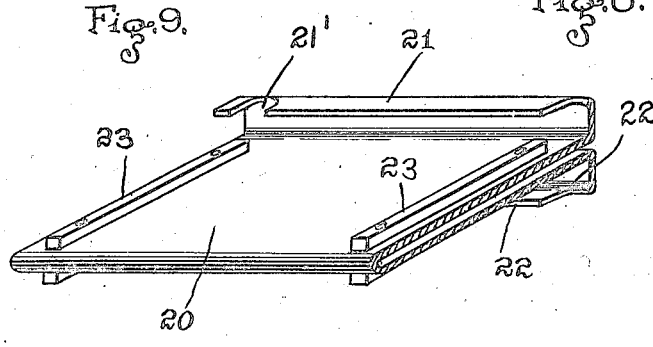
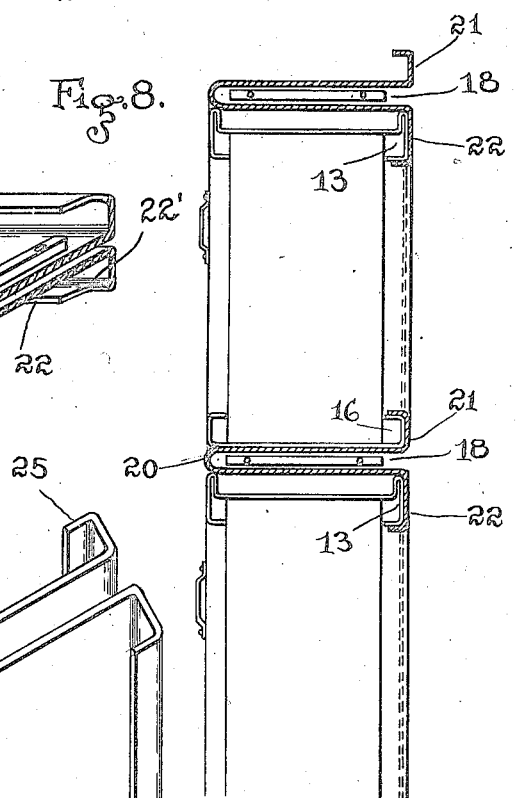
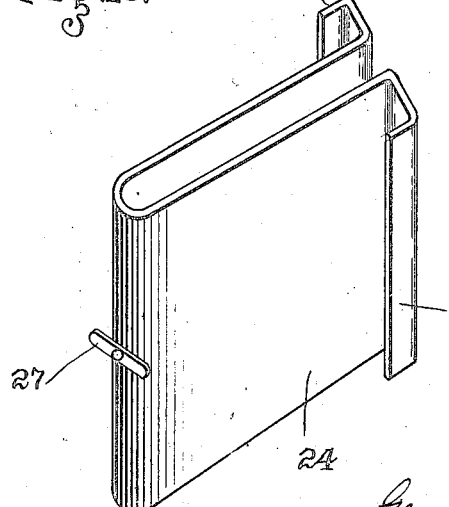
INVENTOR
George Scott Dauphinee
BY
ATTORNEY Patented June 26, 1928.

1,674,764

UNITED STATES PATENT OFFICE.

GEORGE SCOTT DAUPHINEE, OF NEW YORK, N. Y., ASSIGNOR TO THE COOLING TOWER CO., INC., OF NEW YORK, N. Y., A CORPORATION OF NEW YORK.

AIR FILTER.

Application filed July 14, 1925. Serial No. 43,450.

My invention relates to improvements in air filters.

An object of my invention is to provide a simple convenient and efficient device for the purpose of removing from the air, foreign matter such as dust and other particles of like nature and delivering the air purified. Another object of my invention is to provide a filter media in two stages, the first stage having large dust chambers so that the great bulk of the dust especially the larger and heavier particles may be there eliminated without obstructing the air flow, and the second stage handling the finer particles and so arranged as to have a gradually increasing density from entrance to exit. Another object of my invention is to provide suitable means for gradually and continuously feeding the filter surfaces with oil or the like. Another object of my invention is to provide a device of the nature specified which may be adjusted to varying atmospheric conditions. Another object of my invention is to provide a device of the nature specified composed of interchangeable sections. Another object of my invention is to provide a device of the nature specified in which the parts may be readily taken apart for cleaning, replacement and the like. A further object of my invention is to provide a simple and convenient means for stacking together a plurality of filter units.

I accomplish these objects by the device illustrated in the accompanying drawings, in which Figure 1 is a front view of a filter unit section, Figure 2 is a vertical section of the same on the line 2—2 in Figure 1, Figure 3 is a view of one of the division plates, Figure 4 is a detail of the horizontal section on the line 3—3 in Figure 2, Figure 5 is a detail of the oil feed, Figure 6 is a horizontal section of the same, Figure 7 is a view showing the method of stacking the filter unit sections, Figure 8 is a vertical section showing a plurality of filter unit sections assembled, Figure 9 is a view of the horizontal spacer, and Figure 10 is a view of the vertical spacer.

Similar characters of reference refer to similar parts throughout the several views.

My improved filter unit section preferably includes a frame 1 open at the front and rear, near the top of which is provided a basin 2, adapted to contain absorbent material 3, and below which are arranged the filter surfaces. These filter surfaces include angular baffle plates 4 4, set vertically at the entrance side of the frame 1 in spaced relation to each other, division plates $4^1$ $4^1$ extending rearwardly therefrom, and vertical coils or spirals 5, 6, 7, 8, 9 and 10 set between the division plates.

The upper edges $4^3$ of the angular baffle plates 4 preferably extend into the basin 2, which is apertured to receive them.

Apertures $2^1$ are provided in the basin 2 at the points where the coils contact with the division plates $4^1$ below the basin 2.

The vertical coils 5, 6, 7, 8, 9 and 10 are progressively of closer coil from front to rear.

I preferably bend over the front lip 11 of the basin 2 to engage the front edges of the baffle plates 4. The rear lip 12 of the basin 2 is extended horizontally to rest upon a bent over section 13 of the frame 1 by which the basin 2 is supported and this also serves as an air lock to prevent the air from leaking through the device above the basin 2.

The baffle plates 4, division plates $4^1$ and spiral coils 5, 6, 7, 8, 9, 10 rest upon a base plate 13 which is provided at its front edge with a lip 14 bent up to engage the front edges of the baffle plates 4 and has at its rear edge a lip 15 bent up to engage a bent over section 16 of the frame 1 forming an air lock.

A lug 17 may be provided in the floor of the frame 1 to engage and position the base plate 13 and the parts carried thereon.

The filter unit section being thus assembled, oil or like viscous material is supplied to the absorbent material 3 in the basin 2 so that it is thoroughly saturated and this oil will pass by capillary attraction to the surface of the baffle plates 4 which extend into the basin 2 and will also pass through the apertures $2^1$ in the bottom of the basin 2 to the division plates $4^1$ and the coils or spirals 5, 6, 7, 8, 9, 10 and the entire inner surfaces of the filter unit will thus be kept continually coated with oil.

I preferably provide in the division plates $4^1$ slots or apertures $4^2$ which serve to hold the oil and more evenly distribute it.

The air entering the filter unit in the direction of the arrows in Figure 2, strikes the inclined angular surfaces of the baffle plates 4, 4 and passes thence across the spirals 5, 6, 7, 8, 9, 10 between the division plates 4¹.

The first stage of the filtering process thus embraces the baffle principle having large dust chambers. As the dust laden air strikes these baffle plates, the larger and heavier particles will adhere to these baffle plates and will be there removed from the air in such manner as not to seriously interfere with the subsequent air flow and when a quantity of the dust is there collected it will fall down to the floor of that section.

The air then passes into the second stage or true filter section which includes the coils or spirals 5, 6, 7, 8, 9, 10 of progressively closer coil, and between the division plates 4¹ all of which are coated with oil. The tortuous passage across these coils causes all particles of dust or foreign matter to come into contact with a viscous coated surface so that as the air passes out at the rear of the device all dust and foreign matter is removed and the air is purified.

The capacity of the air filter for the passage of air is fixed by the smallest open area, which is through the smallest coil apertures. The deposit of the dust particles on the spread or loose coils at the front of the filter does not therefore seriously interfere with the passage of air through the filter nor serously diminish the capacity of the device.

The efficiency of the filter may be modified as conditions may require by spreading out or tightening the coils or some of them or by adding to or reducing the number of coils.

I have found it desirable in some conditions to ararnge the coils in pairs of like size so that two front coils 5 and 6 will be of like spread, the next two intermediate coils will be of like size and the two rear coils 9 and 10 will be of like size or spread but this arrangement may be varied as conditions may dictate.

As will be apparent the parts of the filter section may be readily taken apart for cleaning, replacement and the like and reassembled as required.

To facilitate cleaning and handling, I prefer to construct the filter of small sections or units of convenient size and of the character above described.

I prefer to arrange these sections to give the desired capacity by providing shelves 18 upon which the sections are carried. These shelves may be supported by suitable uprights 19 as shown in Figure 7.

On the shelves 18 I preferably provide spacers 20 of sheet metal bent to fit over the shelf 18 and to extend from the front to the rear of the shelf. The rear edge sections of the spacers 20 are turned over to form lips 21, 22 which grip the filter sections and form air locks to prevent the air from leaking through above and below the filter sections.

On the spacers 20 I provide spacing straps 23. Vertical spacers 24 are formed of sheet metal bent over upon itself with space between the leaves to receive the straps 23. The rear edge sections of these vertical spacers are turned over to form lips 25, 26 which grip the vertical sides of the filter sections whereby the air is prevented from leaking between the filter sections. The lips 21, 22 are provided with cut out seats 21¹, 22¹ for the lips 25, 26 or the lips may be otherwise shaped to produce a substantially air tight joint between the filter sections.

It will thus be apparent that the filter sections are supported on the shelves in such manner that any of the filter sections may be removed and replaced as desired with little or no interruption of the operation of the device and that during the interval while a filter section is undergoing repair its place may be closed or filled in any suitable manner without interfering with the operation of the remaining sections.

The filter sections may be locked in position by means of turn buttons 27 provided on the front edges of the spacers 24 or in any desired manner.

Having thus described my invention, what I claim is:

1. In a device of the character described the combination of a casing having an open entrance side and an open exit side, baffle plates arranged adjacent the entrance side, coils arranged adjacent the exit side and a container for viscous material arranged above the baffle plates and coils and adapted to supply a viscous coating thereto.

2. In a device of the character described the combination of a casing having an entrance side and an exit side, baffle plates arranged adjacent the entrance side and coils in the casing of progressively increasing density and means for supplying a viscous coating to the plates and coils.

3. In a device of the character described the combination of a casing having an entrance end and an exit end, coils therein of progressively increasing density from entrance to exit and means for supplying a viscous coating to the coils.

4. In a device of the character described the combination of a casing having an entrance and an exit, coils of progressively increasing density between the entrance and the exit and plates between the coils and means for supplying a viscous coating to the coils and plates.

5. In a device of the character described, the combination of a plurality of filter sections, shelves adapted to support the filter sections and spacing members on the shelves adapted to engage the filter sections and to form air locks to prevent the leakage of air between the filter sections.

6. In a device of the character described, the combination of a casing having an entrance side and an exit side, parallel rows of coils in said casing increasing in density from said entrance side to said exit side and means to prevent interlocking of said coils.

7. In a device of the character described, the combination of a plurality of upright members, shelves supported by said members, vertical spacers between said shelves, filter sections supported by said shelves and lips engaging said sections to form air locks to prevent the leakage of air between the filter sections.

8. In a device of the character described the combination of a plurality of upright members, shelves supported by said members, spacers substantially enclosing said shelves, straps on said spacers, vertical spacers engaging said straps and positioned between said first mentioned spacers.

9. In a device of the character described, the combination of parallel spaced uprights, shelves supported by said uprights, spacers mounted on said shelves, vertical spacers between said shelves, means on said shelves to position said vertical spacers, filter sections abutting said spacers and said vertical spacers and interlocking means on said spacers and said vertical spacers in engagement with said filter sections to form air locks.

10. In a device of the character described, the combination of parallel spaced uprights, shelves supported by said uprights, spacers mounted on said shelves, vertical spacers between said shelves, means on said spacers to position said vertical spacers, shelves to position said vertical spacers, filter sections abutting said spacers and said vertical spacers and interlocking means on said filter sections and said spacers and vertical spacers to form an air lock whereby leakage of air is prevented.

In testimony whereof, I have signed my name to this specification this 13th day of July, 1925.

GEORGE SCOTT DAUPHINEE.